No. 880,822. PATENTED MAR. 3, 1908.
I. RAMBOUX.
MARBLE AND STONE SAW.
APPLICATION FILED OCT. 10, 1906.
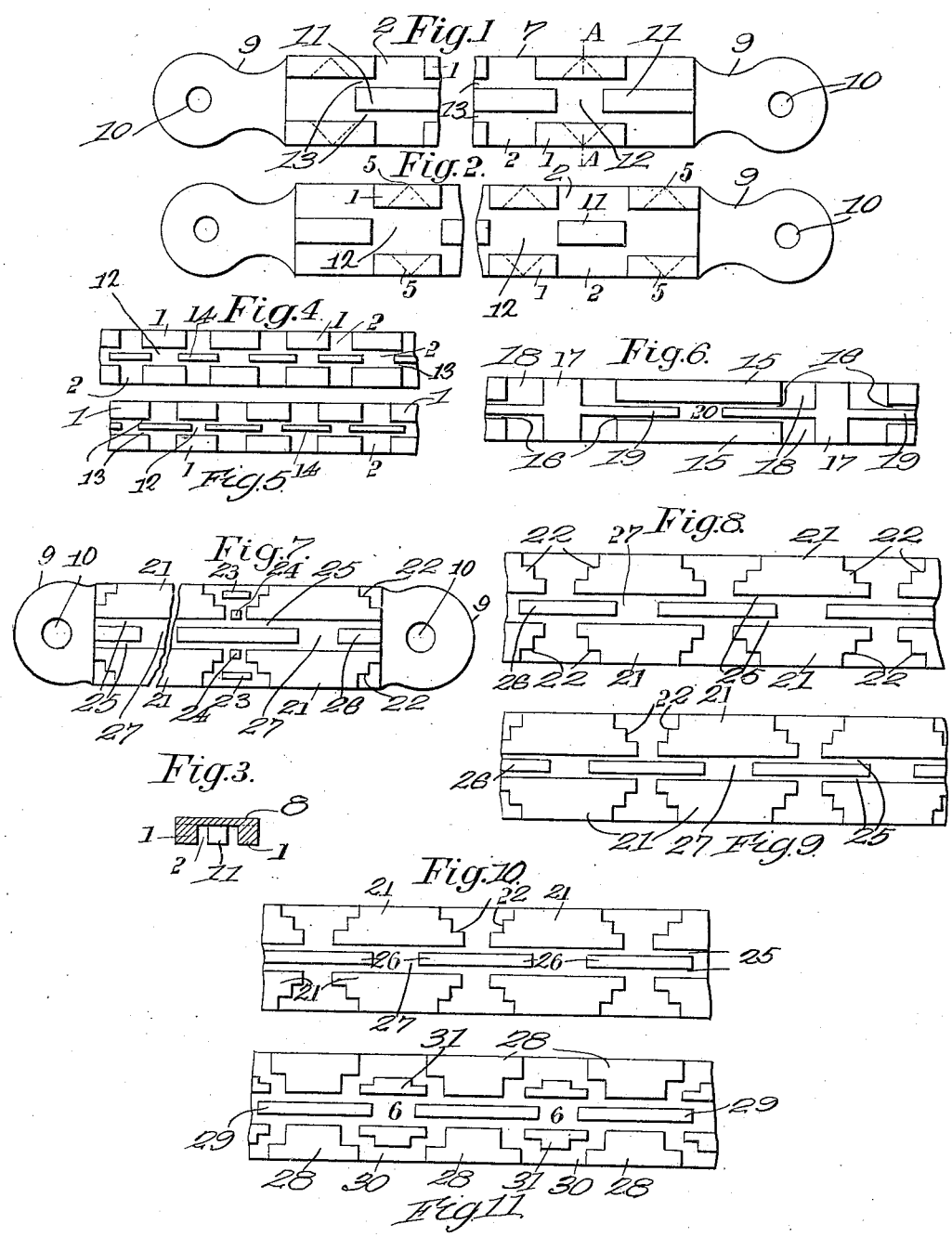

UNITED STATES PATENT OFFICE.

ISIDORE RAMBOUX, OF ERQUELINNES, BELGIUM.

MARBLE AND STONE SAW.

No. 880,822.  Specification of Letters Patent.  Patented March 3, 1908.

Application filed October 10, 1906. Serial No. 338,298.

*To all whom it may concern:*

Be it known that I, ISIDORE RAMBOUX, a subject of the King of Belgium, and resident of Erquelinnes, Belgium, have invented certain new and useful Improvements in Marble and Stone Saws, of which the following is a specfication.

This invention relates to improvements in saws of that character which are designed for operation upon and in connection with stone and like material and the nature and the object of the invention will be more fully set forth in connection with the accompanying drawing and will be more particularly pointed out and ascertained in and by the appended claims.

In the drawing, Figure 1 illustrates in side elevation one embodiment of the invention. Fig. 2 illustrates a modified form thereof. Fig. 3 is a sectional view on line A—A of Fig. 1. Figs. 4 to 11 inclusive illustrate further modifications of the invention.

Like numerals of reference designate similar parts throughout the different figures of the drawing.

The invention will be described in connection with the specific embodiment shown but it will be understood that the invention is not to be limited to such specific showing except for such limitations as the claims import.

As shown the improved saw comprises a body portion 7 which is provided on one side with a continuously smooth surface 8 and is provided, preferably on the opposite side, with a plurality of projections or teeth adapted for engagement with the stone or like material to be sawed. At its opposite ends, and referring more especially to Figs. 1 and 2 in the present description, the body portion is provided with projections 9 preferably apertured at 10 and adapted for connection with any suitable saw operating means, not shown. Preferably the teeth are arranged in rows and the teeth 1 of the outermost rows are conveniently disposed out of alinement with the teeth 11 of the innermost row. Said teeth 1 are also spaced apart from each other to form intervening spaces 2 and the teeth 11 are likewise spaced apart from each other to form intervening spaces 12 which spaces 12 are out of alinement with the spaces 2. I also desirably locate the rows of teeth in a manner to form intervening spaces between each row which spaces are indicated at 13.

It will be seen from the foregoing that the spaces 2 and 12 communicate with each other by means of the spaces 13 thus the sand or other material usually employed in the operation of sawing stone and delivered from a point above the saw will have its progress retarded and will efficiently and economically coöperate with the teeth during the sawing operation.

By reference to Fig. 1 it will be seen that sand received by the cavities 2 will fall upon the intermediate row of teeth 11 and subsequently upon the lower row 1 and finally through the lower cavities 2.

In the modified form shown in Fig. 2 the teeth 1 and 11 are disposed in rows and in staggered relation but the cavities 2 are equal in length to the teeth. It will thus be seen that the intervening spaces 13 are not present in this construction and therefore the sand or other material will not be retarded in its progress to such an extent as in the form shown in Fig. 1. This latter form of saw has special advantages when used in connection with grades of stone of a lesser density and which yields more readily to the action of the saw.

In Figs. 4 and 5 the inner row of teeth 14 are disposed in substantially the same relation with respect to the outermost rows 1 but are located in closer relation with respect thereto than in the construction heretofore described and are relatively reduced in thickness with respect to the teeth 1.

In Fig. 6 there is shown a form of the invention wherein the outermost rows of teeth 15 are somewhat elongated and are spaced apart vertically to form a relatively reduced intervening space 16. Between the teeth 15 there is located a row of intermediate teeth the central portions 17 of which extend throughout the depth of the saws and are located in a manner to form spaces 18. Said intermediate row of teeth 17 as shown are provided with lateral extensions 19 which project between the rows of teeth 15 and form spaces 20 communicating with the spaces 18 through the spaces 16. In this construction the sand or other material will be retarded to a relatively greater extent than in the constructions heretofore described and this feature has special advantages in connection with stone of a relatively hard quality.

In Fig. 7 is shown a further modification wherein the outermost rows of teeth 21 are provided with cutting or stepped portions 22 at their adjacent ends, and in this form said stepped portions diverge from the base toward the top of each tooth. Between said stepped portions are provided retarding teeth or projections 23 and 24 the upper projection 23 of which serves to prevent immediate passage of the sand through the spaces between the stepped portions and causes the sand to be directed thereon. The projections 24 serve to retard passage of the sand downwardly from said stepped portions to the intervening space 25. A plurality of relatively reduced and elongated teeth 26 are disposed in the intervening space 25 and out of alinement with the teeth 21 so that the spaces formed between the latter are opposite the teeth 26. The teeth 26 are spaced apart from each other as at 27 to effect a circuitous route for the sand. It will be understood that the retarding projections or teeth 23 and 24 of the lower row perform their function in substantially the same manner as those of the upper row.

In Fig. 8 is shown a further modification which is substantially the same as that shown in Fig. 7 except that the retarding members 23 and 24 are omitted.

Fig. 9 is a further modification substantially like Fig. 8 illustrating a different location of the teeth whereby the spaces therebetween are relatively reduced.

Fig. 10 is a view of a still further modification wherein a still further difference of arrangement of the teeth is shown.

Fig. 11 illustrates an embodiment of the invention wherein the outermost rows of teeth 28 are provided with stepped portions on their inner faces. An intermediate row of teeth 29 is provided and said teeth are so located that their spaces 6 register with spaces 30 between the teeth 28. To prevent direct passage of the sand downwardly through spaces 6 and 30 stepped retarding teeth 31 are provided which serve to discharge the sand entering the spaces 30 upon the teeth 29.

I claim:

1. A saw blade for sawing stone consisting of a bar of metal provided on one side with a continuously smooth surface and having a plurality of projections or teeth extending from the opposite side, said projections or teeth being spaced apart from each other and disposed in staggered relation in a manner to bring the intervening spaces between said teeth out of register with each other.

2. A saw blade for sawing stone, consisting of a bar of metal provided on one side with a continuously smooth surface and having a plurality of projections or teeth extending from the opposite side, said teeth being spaced apart from each other and arranged in parallel rows and in a manner to bring spaces intervening the teeth of one row out of register with the spaces intervening the teeth of adjacent rows.

3. A saw blade for sawing stone comprising a bar of metal provided on one side with a continuously smooth surface and having on its other side superposed cutting means retarding the progress of sand or like cutting material and effecting distribution thereof about said means.

4. A saw blade for sawing stone consisting of a bar of metal provided on one side with a smooth surface and having a plurality of projections or teeth extending from another side, certain of said teeth having stepped end portions.

5. A saw blade for sawing stone consisting of a bar of metal provided on one side with a smooth surface and having a plurality of projections or teeth extending from another side, said projections or teeth being spaced apart from each other and out of alinement with each other to bring intervening spaces out of register, and the outermost teeth having stepped end portions.

6. A saw blade consisting of a bar of metal provided with a plurality of projections or teeth, certain of said teeth having stepped portions.

7. A saw blade comprising a bar of metal having a plurality of projections or teeth, the adjacent ends of certain of said teeth being stepped.

8. A saw blade comprising a bar of metal having a plurality of projections or teeth, the adjacent ends of certain of the teeth being stepped and the stepped portions diverging outwardly.

9. A saw blade comprising a bar of metal having a plurality of projections or teeth, the adjacent ends of certain of said teeth being stepped, and relatively short retarding projections or teeth located adjacent said stepped portions.

10. A saw blade comprising a bar of metal having a plurality of teeth spaced apart from each other, and retarding projections or teeth located between said first mentioned teeth and relatively reduced in size with respect thereto.

In testimony whereof, I have hereunto set my hand in presence of two witnesses.

ISIDORE RAMBOUX.

Witnesses:
 AAIIHIE MARINELLE,
 C. J. DIEBEL.